3,464,935
Patented Sept. 2, 1969

3,464,935
RIGID, NON-ELASTOMERIC, NON-CELLULAR, FIBER REINFORCED POLYETHER-URETHANE COMPOSITIONS
Joseph J. Sepkoski, Geddes, Robert F. Trepa, Salina, and Edward R. Degginger, Syracuse, N.Y., assignors to Allied Chemical Corporation, New York, N.Y., a corporation of New York
No Drawing. Filed Apr. 5, 1966, Ser. No. 540,224
Int. Cl. C08g 51/10, 22/14
U.S. Cl. 260—9     12 Claims

ABSTRACT OF THE DISCLOSURE

Invention relates to rigid, non-elastomeric, non-cellular, fiber reinforced urethane compositions and methods for preparing them; said composition characterized by high flexural strength and prepared by impregnating a fibrous reinforced material with a polyether urethane prepared by admixing a blend of polyethers having an average functionality of from 4.0 to about 7.5 and an average hydroxyl number of from 300 to about 600, with an organic polyisocyanate and curing said impregnated fibrous material.

---

Reinforced plastics comprising polyester resins, copolymers of polyester resins with vinyl monomers or epoxy type resinous materials reinforced with filaments or fibers of a variety of materials such as glass, nylon, cellulose, asbestos, cotton, carbon and the like are well known. The fibrous reinforcing materials may be present in the plastic mass in the form of fibers or filaments randomly distributed throughout the mass; or they may take the form of woven yarns spun from fibers or comprise bundles of filaments arranged in layers within the plastic. Alternatively, they may take the form of mats or felted fibers or substantially parallel filaments. The foregoing reinforced laminates, although useful for many applications, suffer from serious drawbacks which have greatly limited the application of reinforced laminates. The principal drawbacks of the foregoing commercial resins are their low interlaminar shear values, low heat distortion temperatures, and in some cases, their extremely high cost which has limited their use to applications where cost is not an item for consideration.

Glass fibers in particular are widely used as a reinforcing agent for plastics such as the synthetic resins of various types and synthetic and natural rubber and the like because of the high strength which they impart to the products made therefrom. Glass fibers when used as a reinforcing agent produce a high dimensional stability and minimum warpage in the end product. Glass fiber reinforcing will minimize the products tendency to take a "set" or otherwise become permanently deformed. Most of the strength of the foregoing products is due to the presence of the glass fiber with the resin serving principally as a binder or matrix to prevent movement of the fibers. However, the strength of the resin is very important if the product is to be subject to any kind of flexure, shear or torque. In this instance, the resin is the limiting strength factor because it prevents the fibers from breaking apart or sliding over one another (interlaminar shear). The resin is also the limiting factor on the temperature at which the product can be used, so it is desirable to have the resin as resistant to heat as possible.

It is therefore a primary object of the present invention to provide novel rigid, non-cellular, non-elastomeric urethane resin impregnating materials for fibers and filaments which are both more efficient and more economical than the impregnating materials previously employed. Another object of the present invention is to provide novel fiber reinforced rigid, non-cellular, non-elastomeric polyether urethane compositions characterized by high resistance to interlaminar shear. A further object of the present invention is to provide novel, filament-wound glass urethane products.

Other objects and advantages of the invention will be apparent from the following detailed description of certain preferred embodiments thereof.

Non-cellular urethane resins have been reported in the literature and are commercially available. These products differ from the non-cellular urethane resins of the present invention in that the prior art urethanes are elastomeric, viz., these resins have elongations in excess of 100% and when stretched will return to their original length when the stress is relieved. Whereas the non-cellular urethane resins of the present invention are non-elastomeric, viz., the unfilled resins have elongation values of less than 100% and preferably have elongation values ranging from about 6% to about 25%.

The distinctive properties of these non-cellular, rigid urethanes is attributed to the polyether composition employed. A combination of polyethers, prepared either through the addition of alkylene oxides to mixed polyhydric alcohol initiators or polyethers prepared by blending two or more polyethers is employed. The polyethers responsible for the unique properties of the urethane resin are mixtures of polyethers prepared by either of the above methods where the polyhydric alcohols employed are used in such proportions, in consideration of their functionality, that the resulting average functionality of the polyether is between 4.0 and 7.5. These mixtures can be achieved by judicious combinations of any of the following: propylene glycol, 1,2,6-hexanetriol, glycerol, trimethylol propane, pentaerithritol, sorbitol, methyl glucoside, sucrose, and the like. The presence of water and catalysts present in most polyether preparations, contribute to the formation of bifunctional polyether and reduce the functionality below that of the polyhydric alcohol initiators employed.

The polyethers are prepared by the condensation of propylene oxide or mixtures of propylene oxide and additional alkylene oxides such as ethylene oxide provided such mixtures do not contain more than 20 mol percent of the additional oxide. The condensation reaction may be carried out in the presence of a sutiable catalyst by heating a mixture of the alkylene oxide and initiator at sufficiently high temperature to effect the desired reaction.

The preferred method for carrying out the reaction is to add the alkylene oxide components gradually to a stirred, heated mixture of the desired initiator system and alkaline catalyst, such as sodium or potassium hydroxide. The temperature at which the reaction is run will depend upon the particular system employed and the concentration of the catalyst in the system. The temperatures required for any given reaction will vary from about 50–150° C. preferably 80–130° C. depending on the initiators and the type and concentration of catalysts employed.

In order to be acceptatble for the production of the novel rigid, non-cellular, non-elastomeric urethane resins of the instant invention, the polyethers thus produced must have a functionality of 4.0–7.5. If a mixture of two or more polyethers is employed where one of the polyethers has a functionality below 4.0 such as polyethers initiated on glycerol and the other has a functionality above 4.0 such as polyethers initiated on hexols, or octols, the ratio of high and low functionality polyethers which may be employed in the foregoing mixtures extends from about 70:30 to 30:70 equivalent percent so long as the resulting blend has an average functionality within the range of 4.0 to 7.5. Likewise, when the polyether is formed by coinitiators, viz, a mixture of triol and hexols or octols, the ratio of triol to hexol or octol may range from about 30:70 to 70:30 equivalent percent so long as the resulting polyether has a functionality within the range of 4.0 to 7.5. The polyethers employed in the preparation of the novel urethane resins of the instant invention shall have, in addition to the foregoing limitations respecting functionality, a hydroxyl number of between 300 and 600. The hydroxyl number represents the number of milligrams of KOH equivalent to the hydroxyl content of 1 gram of the polyether.

Basically, the novel urethane resins of the instant invention are produced through the combination of a polyisocyanate with or without catalysts and a polyether mixture having an average functionality of 4.0–7.5 and a hydroxyl number within the range of 300 to 600. The polyisocyanate employed may be any one or mixture of those conventionally employed in polyether urethane production such as, hexamethylene diisocyanate, naphthalene-1,5-diisocyanate, tolyene diisocyanate, 4,4'-diphenyl - methane diisocyanate, 1,4 - phenylene diisocyanate, 4,4' - diphenyldiisocyanate, polymethylene polyphenylisocyanate and the like with the 80/20 mixture of the 2,4- and 2,6-isomers of tolylene diisocyanate known as Nacconate 80 (supplied by the National Aniline Division of Allied Chemical Corporation) being preferred. The polyether urethane is formulated with polyisocyanates using an NCO/OH ratio of from 1.3/1.0 to 0.8/1.0 with the preferred ratio being from 1.1/1.0 to 0.95/1.0.

The methods of combining the polyether and polyisocyanates are several and depend to a certain extent on whether the final product is to be cast, compression molded, applied to fiber for filament winding, rotationally cast, thermoformed, etc. Typical methods of combining are:

(A) One-shot method.—In the one-shot method, any of the aforementioned polyethers or blends of these polyethers are reacted after degassing with one of the polyisocyanates mentioned above in an NCO/OH ratio of 0.8/1 to 1.3/1 at temperatures ranging from about 20° C. to about 80° C., preferably about 50° C. and subsequently converted to the resin by curing at elevated temperatures ranging from about 100° C. to about 140° C.

(B) Prepolymer method.—In the prepolymer method, any of the above mentioned polyether mixtures is reacted with a sufficient excess of polyisocyanate to achieve a stable liquid. This, as part A, is reacted with remainder of the same polyether mixture or another polyether mixture (part B) to effect the required NCO/OH ratio of from 0.8/1.0 to 1.3/1.0. After combining and degassing part A and part B, the urethane mixture is poured into a mold and subsequently converted into the desired product by curing at elevated temperatures ranging from about 100° C. to 140° C.

The above systems may be handled largely in the absence of catalysts; however, a wide variety of known catalysts, such as the organo-metallic compounds, i.e., dibutyltin dilaurate, phenylmercuric propionate and tertiary amines, i.e., triethylamine may be employed where required for certain applications.

The following examples are given to illustrate the resin systems of the present invention.

Example I.—One-shot method

Into a resin flask equipped with a motor driven stirrer, thermometer, and vacuum outlet tube was charged 100 parts by weight (p.b.w.) of a polyether prepared by propoxylating a 50/50 equivalent percent mixture of glycerol and sorbitol to a hydroxyl number of 443 (approx.: molecular weight of 500). With stirring, the temperature of the polyether was raised to 75° C. and this temperature was maintained for 30 minutes while the polyether was degassed under a vacuum of 3 to 10 mm. Hg. At the end of this time, the polyether was cooled to 50° C. and 68.8 p.b.w. of an 80/20 mixture of 2,4- and 2,6-tolylene diisocyanate was added to the polyether. Degassing with stirring was then continued for 1 to 5 minutes. At the end of this time the mixture was poured into a preheated mold treated with a suitable mold release agent. The mold was then transferred to an oven and heated for one hour at 100° C. and two hours at 140° C. The properties of the resulting non-cellular urethane resin appear in the table of resin properties which follows the examples.

Example II.—One-shot method

Into a resin flask equipped with a motor driven stirrer, thermometer, and a vacuum outlet tube was charged 100 p.b.w. of a polyether, prepared by propoxylating 30/70 equivalent percent mixture of glycerol and sorbitol to a hydroxyl number of 349 (approx. molecular weight of 738). With stirring, the temperature of the polyether was raised to 75° C. and this temperature was maintained for 30 minutes while the polyether was degassed under a vacuum of 3 to 10 mm. Hg. At the end of this time, the polyether was cooled to 50° C. and 54.2 p.b.w. of an 80/20 mixture of 2,4- and 2,6-tolylene diisocyanate was added to the polyether. Degassing was then continued for 1 to 5 minutes. At the end of this time, the mixture was poured into a preheated mold treated with a suitable mold release agent. The mold was then transferred to an oven and heated for one hour at 100° C. and two hours at 140° C. The properties of the resulting non-cellular urethane resin appear in the table of resin properties, which follows the examples.

Example III.—One-shot method

Into a resin flask equipped with a motor driven stirrer, thermometer, and vacuum outlet tube was charged 100 p.b.w. of a polyether prepared by propoxylating a 40/60 equivalent percent mixture of glycerol and sucrose to a hydroxyl number of 466 (approx. molecular weight of 667). With stirring, the temperature of the polyether was raised to 75° C. and this temperature was maintained for 30 minutes while the polyether was degassed under a vacuum of 3 to 10 mm. Hg. At the end of this time, the polyether was cooled to 25° C. and 72.3 p.b.w. of an 80/20 mixture of 2,4- and 2,6-tolylene diisocyanate was added to the polyether. Degassing was then continued for 1 to 5 minutes. At the end of this time, the mixture was poured into a preheated mold treated with a suitable mold release agent. The mold was then transferred to an oven and heated for one hour at 110° C. and two hours at 140° C. The properties of the resulting non-cellular urethane resin appear in the table of resin properties which follows the examples.

Example IV.—Prepolymer method (A) Into a resin flask equipped with a motor driven stirrer, thermometer, and nitrogen inlet tube were charged 320 p.b.w. of an 80/20 mixture 2,4- and 2,6-tolylene diisocyanate and 50 p.b.w. of a polyether, prepared by propoxylating a 50/50 equivalent percent mixture of glycerol and sorbitol to a hydroxyl number of 443 (approx. molecular weight of 500). The mixture was stirred under a blanket of dry nitrogen gas with a minimum amount of heat. After the peak exotherm was reached, the mixture was allowed to cool to 80° C. and an additional 50 p.b.w. of the aforementioned polyether was added. The mixture was stirred while maintaining the temperature at 80–90° C. under a blanket of dry nitrogen gas for two hours. This material represents part A of the two-component system.

(B) Into a resin flask as described above was charged 360 p.b.w. of the polyether as described in A, and it was degassed at 75° C. for 30 minutes under a vacuum of 3–10 mm. Hg. At the end of this time, the mixture was cooled to 50° C. This product represents part B in this two-component system.

(C) Part A and part B were combined and degassed with stirring for 1 to 5 minutes. At the end of this time, the mixture was poured into a preheated mold which had been treated with a suitable mold release agent. The mold was then transferred to an oven and heated for one hour at 100° C. and two hours at 140° C.

Examples V–X.—One-shot method

The procedures outlined in Example I above were repeated except that the polyethers employed were as follows:

Ex. V—a 40/60 mixture of glycerol/sucrose propoxylated to a hydroxyl number of 528.
Ex. VI—a 50/50 mixture of glycerol/sorbitol propoxylated to a hydroxyl number of 401.
Ex. VII—a 50/50 mixture of glycerol/sorbitol propoxylated to a hydroxyl number of 352.
Ex. VIII—a 70/30 mixture of glycerol/sorbitol propoxylated to a hydroxyl number of 356.
Ex. IX—a 30/70 mixture of glycerol/sucrose propoxylated to a hydroxyl number of 353.
Ex. X—a 40/60 mixture of glycerol/sucrose propoxylated to a hydroxyl number of 343.

The properties of the rigid, non-cellular, non-elastomeric urethane compositions prepared in accordance with the foregoing examples appear in the following table.

(3) Laminating.—A method by which superimposed layers of polyether urethane impregnated glass fiber are bonded together usually by means of heat and pressure, to form a single piece.

(4) Filament winding.—A method by which a polyether urethane impregnated glass filament is wound on a filament winding machine and the resin is allowed to cure to give a glass reinforced structure.

We have found the rigid, non-cellular, non-elastomeric urethane resins of the present invention to be particularly well adapted to filament winding applications because of their exceptional adherence to glass, their rapid wetting action with glass, and the unusually high resistance to interlaminar shear of the glass filament-wound structures.

Filament winding was developed to capitalize on the tremendous strength of fiber glass. As noted previously, most of the strength in the filament wound product is due to the fibrous reinforcing material with the resin serving principally as a binder to distribute stress and to prevent movement of the fibers. However, the strength of the resin is very important if the wound product is to be subject to any kind of flexure, shear, or torque. In such instances, the resin is the limiting strength factor because it prevents

TABLE I.—TABLE OF PHYSICAL PROPERTIES OF NON-REINFORCED RESIN

| Example | I | II | III | IV | V | VI | VII | VIII | IX | X |
|---|---|---|---|---|---|---|---|---|---|---|
| Hydroxyl number | 443 | 349 | 466 | 443 | 528 | 401 | 352 | 356 | 353 | 343 |
| Initiator ratio | 50/50 | 30/70 | 40/60 | 50/50 | 40/60 | 50/50 | 50/50 | 70/30 | 30/70 | 40/60 |
| Ultimate tensile strength, p.s.i | 12,760 | 9,480 | 13,520 | 12,760 | 16,666 | 10,860 | 10,190 | 9,560 | 9,720 | 9,330 |
| Ultimate elongation, percent | 15.0 | 18.2 | 14.3 | 15.0 | 6.2 | 16.1 | 14.0 | 15.8 | 21.1 | 19.2 |
| Flexural strength, p.s.i | 20,710 | 15,890 | 20,020 | 20,710 | 25,449 | 17,640 | 16,390 | 15,570 | 16,700 | 15,910 |
| Flexural modulus, p.s.i | 515,660 | 470,780 | 518,220 | 515,660 | 536,347 | 478,510 | 490,360 | 452,370 | 468,220 | 479,100 |
| Compressive strength, p.s.i | 17,780 | 12,880 | 19,350 | 17,780 | 21,370 | 12,980 | 14,320 | 13,330 | 14,630 | 14,160 |
| Izod notched impact strength, ft.-lb./in. notch | 0.70 | 0.50 | 0.39 | 0.70 | 0.30 | 0.50 | 0.64 | 0.83 | 0.49 | 0.54 |
| Heat distortion temperature, 264 p.s.i. fiber stress, ° C | 100 | 71 | 116 | 100 | 140 | 78 | 73 | 72 | 91 | 96 |

NOTE.—All examples use Nacconate 80 and a 1:1 NCO/OH ratio.

Rigid, non-cellular, non-elastomeric urethane resins such as those described in the foregoing examples have been found to be particularly well adapted for use as a matrix in glass fiber reinforcing applications because of their exceptional adherence to glass, their exceptionally rapid wetting action with glass, and the unusually high flexural strength values of the resulting resin-glass laminates and filament windings.

The term "glass fiber" as used herein is intended to be employed in a broad sense to induce glass cloth as well as individual, continuous fibers more particularly known as filaments; groups of individual filaments, more particularly known as strands; groups of twisted strands, more particularly known as yarn or thread; untwisted or slightly twisted groups of strands; generally looped back on one another, more particularly known as roving; discontinuous lengths of fibers, more particularly known as staple fibers which can be spun into threads, twisted strands, sliver, roving or yarn; and short or chopped fibers generally less than an inch in length.

Compositions of matter comprising rigid non-cellular, non-elastomeric polyether urethane as the matrix and glass fiber, are highly valuable. Especially those compositions containing glass fiber in proportions of from 75% to 40% and preferably from 65% to 50% based on the weight of the total composition have proved to be very advantageous from the standpoint of improved strength properties.

Various processing techniques may be employed in the preparation of the glass reinforced compositions of the present invention such as:

(1) Casting.—A plastic object is formed by pouring a mixture comprising a fluid polyether urethane and glass fiber into a mold where the cross-linking reaction is completed with or without the application of heat but in the absence of applied of pressure.

(2) Compression molding.—A technique of molding in which the molding composition comprising the polyether urethane and glass fiber is placed in an open mold cavity, the mold is then closed, and heat and pressure are applied until the material has cured.

the fibers from breaking apart or sliding over one another (interlaminar shear).

Filament-wound plastic structures are usually prepared by coating continuous filament with thermosetting resin by impregnation in a resin bath followed by winding the resulting impregnated filament, under tension, on a suitable mandrel. The resulting wound structure is subjected to heating to facilitate the curing of the resin. Some structures are also cured under pressure. In the process of the present invention, glass roving is fed directly from packages to a comb located above the packages, then down into a resin bath in which the roving is passed over rollers which flex the roving while it is exposed to the resin. As the impregnated roving leaves the bath it passes between additional rollers to remove excess resin. The thus impregnated roving is then passed through a guiding eye and on to the winding mandrel where it is wound in a suitable pattern. As soon as the desired thickness is attained, the winding is completed, the mandrel removed from the filament winding machine and the resin-impregnated winding is heated to accelerate the curing process. Curing temperatures may range between 25° C. and 180° C. and the curing cycle maintained for a period of from 5 to 60 minutes. After removal of the cured part from the mandrel, it is subjected to a post cure at about 100° C. to 140° C. for about 1–4 hours. The presence or absence of catalysts determines the severity of the curing conditions.

Where pressure is employed during curing, as for example when flat or relatively flat shapes are wound, the freshly wound mandrel is transferred to a press where a pressure of from 50 p.s.i. to 500 p.s.i. preferably from 100 p.s.i. to 400 p.s.i. is maintained on the pressure blocks of the mandrel with heat being applied. The same temperature and time intervals apply as in the aforementioned cure and post cure operations.

The coupling agents incorporated in the glass roving finish is of secondary importance because of the exceptional ability of uerthane resins to wet and adhere to glass. A wide range of conventional commercial glass finishes have been shown to be acceptable including amino silanes, vinyl silanes, chromium complexes, and other finishes which claim compatibility with epoxy and polyester resins.

The following examples are given to illustrate glass reinforced compositions comprising the novel polyether urethane compositions of the present invention.

Example XI.—Filament winding

The polyol used was prepared by propoxylating a 30/70 glycerol/sucrose mixture to a hydroxyl number of 466 and the polyisocyanate was Nacconate 80.

The Table II which follows illustrates the interlaminar shear properties of the glass filament-wound/urethane product at various temperatures as well as the properties obtained using polyethers prepared by propoxylating 30/70 glycerol/sucrose mixture to a hydroxyl number of 457 in which varying NCO/OH ratios were employed: designated Samples A and B.

TABLE II.—PHYSICAL PROPERTIES OF GLASS FILAMENT-WOUND, NON-CELLULAR, RIGID URETHANE RESINS

| Polyether | Ex. 11 | Ex. 11 | Ex. 11 | Ex. 11 | Ex. 11 | Sample A | Sample B |
|---|---|---|---|---|---|---|---|
| Hydroxyl number | 466 | 466 | 466 | 466 | 466 | 457 | 457 |
| Initiator ratio | 40/60 | 40/60 | 40/60 | 40/60 | 40/60 | 30/70 | 30/70 |
| Isocyanate | Nac. 80 | Nac. 80 | Nac. 80 | Nac. 80 | Nac. 80 | Nac. 80 | Nac. 80 |
| NCO/OH | 1.1 | 1.1 | 1.1 | 1.1 | 1.1 | 1.05 | 1.1 |
| Degrees Fahrenheit | Rm. temp. | 100 | 125 | 150 | 180 | 180 | 180 |
| Interlaminar shear,[1] p.s.i. | 9,500 | 8,200 | 7,100 | 6,500 | 5,700 | 5,815 | 6,150 |

[1] Sample 6 in. x 2 in. x ½ in. supported on 1 in. diameter cylinders spaced 4 in. apart. Stress is applied at the center of the sample using a 1½ in. diameter cylinder.

NOTE.—The glass filament used was E.C.G.-12 End Roving, Aminosilane Finish (type-801). The resin content was 20-30% by weight.

The appropriate amount of polyether was heated to 80° C. and vacuum was applied to dry and degas the polyether with stirring for at least 30 minutes, during which time the polyester gradually cooled to room temperature. During the same period of time, the appropriate quantity of Nacconate 80 was degassed at room temperature with stirring. An ice bath was placed around the resin flask containing the polyether, and the polyether cooled to 25-30° C.; the degassed polyisocyanate was added to the polyether and stirred until a solution was obtained (3 to 5 minutes). The resin flask was then removed immediately to the filament winding machine where the resin bath was filled, the remaining resin was stored in an ice bath for future use.

The glass roving used was fed directly from spools to a comb located approximately six feet above the spools, then down into the resin bath in which the roving passed over three rollers which flexed it while it was exposed to the resin. As the roving came out of the resin bath, it passed between two additional rollers to remove the excess resin. The roving then passed through a perfluoropolyethylene lined guiding eye and on to the rotating mandrel. The mandrel was rotated at 27 r.p.m., and the guide eye moved the two-inch width of the mandrel during approximately eight revolutions.

Under these conditions, 200 to 225 revolutions produced a specimen of the desired thickness of about 0.45 inch. As soon as the winding was completed, the mandrel was removed from the winding machine and transferred to a press where a pressure of 200 p.s.i. on the pressure blocks was maintained. The platens were at 150° C. and the mold was heated by conduction from the platens. The mandrel portion of the mold reached a temperature of 140° C. in 45 to 60 minutes after the mandrel was inserted in the press. The wound structure was then allowed to cure for a minimum of two hours at 140° C.

The specimens were tested for interlaminar shear strength using a 3-point beam loading, with the beam supported on 1-inch round rods on 4-inch centers. Force was applied midway between these centers to the top of the beam by a surface of 3-inch radius. The load applied to the two specimens at failure was 14,000 and 16,000 pounds. Using the formula $S=3p/4bd$ the interlaminar shear values for the various compositions were determined where:

$S$=stress on outer fiber at midspan, in pounds per square inch;
$p$=load at a given point on the load deflection curve, in pounds;
$b$=width of beam tested, in inches; and
$d$=depth of beam tested, in inches.

Example XII.—Preparation of glass cloth laminate

About 30 g. of the urethane resin mix employed in Sample B was charged to the cavity of a matched metal die mold which produces 6 inch discs. The mold was held at room temperature during the filling operation. Type 181 glass cloth was cut into 6 inch discs and 12 plies were placed in the cavity after which about 70 g. of the urethane resin mix was added. The male part of the mold was then placed in the cavity and the mold was placed in a hydraulic compression press with a platen temperature of 136° C. Stops were placed between the top and bottom halves of the mold to effect a ⅛″ thick laminate. Pressure was then applied at about 1400 pounds per square inch and held there for 45 minutes. The laminate was then demolded and postcured for 1 hour at 100° C. and 2 hours at 140° C. in a circulating air oven. The physical properties appear in Table II.

Table III, which follows, illustrates the physical properties of glass cloth laminates prepared with the novel urethane resins of the present invention.

TABLE III.—PHYSICAL PROPERTIES OF GLASS REINFORCED, NON-CELLULAR, RIGID URETHANE RESINS

| | |
|---|---|
| Polyether | Sample B |
| Hydroxyl number | 457 |
| Isocyanate | Nac. 80 |
| NCO/OH | 1.1 |
| Glass | Type 181, cloth |
| Resin/glass ratio | 2.0 |
| Tensile strength, p.s.i. | 30,900 |
| Tensile modulus, p.s.i. | $1.93 \times 10^6$ |
| Flexural strength, p.s.i. | 54,075 |
| Flexural modulus, p.s.i. | $2.06 \times 10^6$ |
| Compressive strength, p.s.i. | 17,925 |
| Initiator ratio | 30/70 |

While the foregoing examples have been limited to a specific embodiment, it is to be understood that the invention is not limited to such specific examples which have been offered for purposes of illustration only and that other fibrous reinforcing materials such as nylon, cellulose, asbestos, cotton, etc., may be substituted without departing from the spirit or scope of the invention.

We claim:
1. A rigid, non-elastomeric, non-cellular, reinforced urethane composition, characterized by high flexural strength properties, comprising (I) a polyether urethane prepared by admixing (a) a blend of polyethers having an average functionality of from about 4.0 to about 7.5 and an average hydroxyl number of from about 300 to 600, said polyether blend being a member selected from the group consisting of (1) polyethers obtained by react- ing at least one alkylene oxide selected from the group consisting of ethylene oxide and propylene oxide with a mixture of polyhydric alcohols selected from the group consisting of polyhydric alcohols containing from 2 to about 8 hydroxyl groups and (2) a mixture of at least two different preformed polyethers obtained by reacting at least one of said alkylene oxides with a polyhydric alcohol selected from the group consisting of polyhydric alcohols containing from 2 to about 8 hydroxyl groups with (b) an organic polyisocyanate wherein the NCO:OH ratio is about 0.8:1 to about 1.3:1 and (II) a fibrous reinforcing material, wherein said polyether urethane composition is cured in intimate contact with said fibrous reinforcing material.

2. The composition as claimed in claim 1 wherein said polyether blend is obtained by reacting at least one of said alkylene oxides with a mixture of polyhydric alcohols selected from the group consisting of polyhydric alcohols containing from 2 to about 8 hydroxyl groups.

3. The composition as claimed in claim 2 wherein said alkylene oxide is a mixture of propylene oxide containing up to about 20 mol percent ethylene oxide and said mixture of polyhydric alcohols consists of glycerol and sucrose.

4. The composition as claimed in claim 1 wherein said curing step is accomplished by heating in the presence of a catalyst selected from the group consisting of organometallic and tertiary amine compounds.

5. The composition as claimed in claim 1 wherein said NCO:OH ratio is from about 0.95:1 to about 1.1:1.

6. The composition as claimed in claim 1 wherein said fibrous reinforcing material is glass fiber and is present in an amount of from 40% to 75% by weight based on the weight of the composition.

7. The composition of claim 1 wherein the curing is effected at a temperature from 25° C. to 180° C.

8. The method of producing shaped plastic articles characterized by high flexural strength properties which comprises, providing a fibrous reinforcing material, impregnating said fibrous material with a polyether urethane resin prepared by admixing (I) a blend of polyethers having an average functionality of from about 4.0 to about 7.5 and an average hydroxyl number of from about 300 to about 600, said polyether blend being a member selected from the group consisting of (a) polyethers obtained by reacting at least one alkylene oxide selected from the group consisting of ethylene oxide and propylene oxide with a mixture of polyhydric alcohols selected from the group consisting of polyhydric alcohols containing from 2 to about 8 hydroxyl groups and (b) a mixture of at least two different preformed polyethers obtained by reacting at least one of said alkylene oxides with a polyhydric alcohol containing from 2 to about 8 hydroxyl groups with (2) an organic polyisocyanate wherein the NCO:OH ratio is about 0.8:1 to about 1.3:1, shaping and curing the impregnated material to obtain the desired product.

9. The method as claimed in claim 8 wherein said blend of polyethers is obtained by reacting at least one of said alkylene oxides with a mixture of polyhydric alcohols selected from the group consisting of polyhydric alcohols containing from 2 to about 8 hydroxyl groups.

10. The method as claimed in claim 8 wherein said curing step is carried out at elevated temperatures ranging from about 100° C. to about 140° C.

11. The method as claimed in claim 8 wherein said fibrous reinforcing material is glass fiber and is present in an amount of from 40% to 75% by weight based on the weight of the composition.

12. The method of claim 8 wherein the curing is effected at a temperature from 25° C. to 180° C.

References Cited

UNITED STATES PATENTS

| 2,751,363 | 6/1956 | Martin | 260—9 |
| 3,245,827 | 4/1966 | Weber | 260—13 |
| 3,309,261 | 3/1967 | Schiller et al. | |
| 3,310,533 | 3/1967 | McElroy | 260—77.5 |

FOREIGN PATENTS

| 894,924 | 4/1962 | Great Britain. |
| 912,555 | 12/1962 | Great Britain. |
| 935,424 | 8/1963 | Great Britain. |

WILLIAM H. SHORT, Primary Examiner

E. W. WOODBERRY, Assistant Examiner

U.S. Cl. X.R.

260—77.5, 37, 6; 156—173; 161—190